(12) United States Patent
Henry et al.

(10) Patent No.: US 6,622,211 B2
(45) Date of Patent: Sep. 16, 2003

(54) VIRTUAL SET CACHE THAT REDIRECTS STORE DATA TO CORRECT VIRTUAL SET TO AVOID VIRTUAL SET STORE MISS PENALTY

(75) Inventors: G. Glenn Henry, Austin, TX (US); Rodney E. Hooker, Austin, TX (US)

(73) Assignee: IP-First, L.L.C., Fremont, CA (US)

( * ) Notice: Subject to any disclaimer, the term of this patent is extended or adjusted under 35 U.S.C. 154(b) by 245 days.

(21) Appl. No.: 09/930,592

(22) Filed: Aug. 15, 2001

(65) Prior Publication Data

US 2003/0037201 A1 Feb. 20, 2003

(51) Int. Cl.[7] .............................................. G06F 12/00
(52) U.S. Cl. ........................ 711/128; 711/118; 711/205; 711/206; 711/207; 711/137; 711/200
(58) Field of Search ................................. 711/128, 205, 711/207, 206, 137, 118, 200

(56) References Cited

U.S. PATENT DOCUMENTS

| | | | |
|---|---|---|---|
| 6,266,752 B1 * | 7/2001 | Witt et al. .................. | 711/200 |
| 6,430,664 B1 * | 8/2002 | Chauvel et al. ............. | 711/168 |
| 6,493,812 B1 * | 12/2002 | Lyon .......................... | 711/207 |
| 6,510,508 B1 * | 1/2003 | Zuraski et al. .............. | 711/207 |
| 6,532,528 B1 * | 3/2003 | Nishimoto et al. ......... | 711/207 |

* cited by examiner

Primary Examiner—Donald Sparks
Assistant Examiner—Mehdi Namazi
(74) Attorney, Agent, or Firm—E. Alan Davis; James W. Huffman

(57) ABSTRACT

A virtual set cache that avoids virtual set store miss penalty. During a query pass of a store operation, only the untranslated physical address bits of the store address are used to index the cache array. In one embodiment, the untranslated physical address bits select four virtual sets of cache lines. In parallel with the selection of the four virtual sets, a TLB translates the virtual portion of the store address to a physical address. Comparators compare the tags of all of the virtual sets with the translated physical address to determine if a match occurred. If a match occurs for any of the four virtual sets, even if not the set specified by the original virtual address bits of the store address, the cache indicates a hit. The matching virtual set, way and status are saved and used during the update pass to store the data.

33 Claims, 7 Drawing Sheets

Virtual Set Cache Operation

Pipelined Microprocessor

FIG. 2  Virtual-Set Cache

| Action | Virtual Set Select Bits |
|---|---|
| load | VA 13:12 |
| store query | don't care |
| store update after cache miss | OVA 13:12 |
| store update after cache hit | RA 13:12 |

_Virtual Set Select Bit Multiplexer Operation_

*Virtual Set Cache Operation*

*Virtual to Physical Address Translation Example*

FIG. 7 after: ST 0x11111000 0xAA

104A

| | way 0 | way 1 | way 2 | way 3 |
|---|---|---|---|---|
| VS0 | | | | |
| VS1 | INVALID | INVALID | 0x33333, M, 0xAA | INVALID |
| VS2 | INVALID | INVALID | INVALID | INVALID |
| VS3 | | | | | after: ST 0x22222000 0xBB

104B

| | way 0 | way 1 | way 2 | way 3 |
|---|---|---|---|---|
| VS0 | | | | |
| VS1 | INVALID | INVALID | 0x33333, M, 0xBB | INVALID |
| VS2 | INVALID | INVALID | INVALID | INVALID |
| VS3 | | | | | after: ST 0x11111000 0xAA

104C

| | way 0 | way 1 | way 2 | way 3 |
|---|---|---|---|---|
| VS0 | | | | |
| VS1 | INVALID | INVALID | 0x33333, M, 0xAA | INVALID |
| VS2 | INVALID | INVALID | INVALID | INVALID |
| VS3 | | | | |

*Virtual Set Store Redirection Example*

VIRTUAL SET CACHE THAT REDIRECTS STORE DATA TO CORRECT VIRTUAL SET TO AVOID VIRTUAL SET STORE MISS PENALTY

FIELD OF THE INVENTION

This invention relates in general to the field of microprocessor caches, and more particularly to virtual set caches.

BACKGROUND OF THE INVENTION

Modern microprocessors include data caches for caching within the microprocessor the most recently accessed data to avoid having to load the data from physical memory or to store the data to physical memory, since accessing physical memory takes an order of magnitude longer than accessing the data cache. For efficiency reasons, data caches do not cache data on a byte granularity basis. Instead, data caches typically cache data on a cache line granularity basis. A common cache line size is 32 bytes.

Data caches are smaller than physical memory. Consequently, when a data cache caches a line of data, it must also save the address of the data in order to later determine whether it has the data when a new instruction executes that accesses data in memory. The saved address of the data is referred to as a tag. When the new instruction accesses a memory address, the data cache compares the new memory address with the addresses, or tags, it has stored to see if a match occurs. If the new address matches one of the tags, then the data is in the cache, and the cache provides the data to the requesting portion of the microprocessor, rather than the microprocessor fetching the data from memory. The condition where the data is in the data cache is commonly referred to as a cache hit.

Data caches store hundreds of tags for hundreds of cache lines cached in the data cache. Comparing a new address with the hundreds of tags stored in the cache would take too long and make the cache too slow. Therefore, caches are arranged as arrays of sets. Each set includes a cache line, or more often, multiple cache lines. A common arrangement for caches is to have four cache lines in a set. Each of the four cache lines is said to be in a different cache way. A cache with four cache lines in a set is commonly referred to as a four-way set associative cache. Typically, when a new cache line is to be stored into a set, the least recently used cache line of the set is chosen for replacement by the new cache line.

By arranging the cache as an array of sets, the time required to compare the new address with the addresses stored in the cache is reduced to an acceptable amount as follows. When a cache line is stored into the cache, the cache does not allow the cache line to be stored into any arbitrary one of the sets in the array. Instead, the set into which the cache line may be stored is limited based on the address of the cache line. The lower order bits of the new address are used to select only one of the sets in the array. The address bits used to select one of the sets from the array are referred to as the index. Since the cache is smaller than the physical memory, only the lower order bits are needed for the index. That is, since the number of cache lines stored in the cache is much smaller than the number of cache lines stored in memory, a fewer number of address bits are needed to index the cache than to index physical memory. Once a set in the cache is selected by the index, the cache need only compare the tags of the cache lines in the selected set with the new address to determine whether a cache hit has occurred.

The number of address bits needed for the index depends upon the number of sets in the array. For example, if the cache has 512 sets, then nine address bits are needed to index the array of sets. Which of the address bits is used for the index depends upon the size of a cache line. For example, if the cache line size is 32 bytes, the lower 5 bits of the address are not used, since those bits are only used to select a byte within the cache line. Hence, for a cache with 512 sets of 32-byte cache lines, address bits 13:5 may used as the index.

Modern microprocessors also support the notion of virtual memory. In a virtual memory system, program instructions access data using virtual addresses. The virtual addresses are rarely the same as the physical address of the data, i.e., the address of the location in physical memory where the data is stored. The physical address is used on the processor bus to access physical memory. Furthermore, the data specified by the virtual memory address may not even be present in physical memory at the time the program instruction accesses the data. Instead, the data may be present in secondary storage, typically on a disk drive.

The operating system manages the swapping of the data between disk storage and physical memory as necessary to execute program instructions. The operating system also manages the assignment of virtual addresses to physical addresses, and maintains translation tables used by the microprocessor to translate virtual addresses into physical addresses. Modern microprocessors employ a translation lookaside buffer (TLB), which caches the physical address translations of the most recently accessed virtual address to avoid having to access the translation tables to perform the translations.

Typical virtual memory systems are paging memory systems. In a paging memory system, physical memory is divided into pages, typically of 4 KB each. Consequently, only the upper bits of the virtual address need be translated to the physical address, and the lower bits of the virtual address are untranslated. That is, the lower bits are the same as the physical address bits, and serve as a physical byte offset from the base address of the physical page. The base address of the physical page is translated from the upper bits of the virtual address. For example, in a paging system with 4 KB pages, the lower 12 bits of the virtual address, i.e., bits 11:0, are untranslated, and are physical address bits. Accordingly, if the virtual address is 32 bits, the upper 20 bits of the virtual address, i.e., bits 31:12, are translated based on the translation tables, and are cached in the TLB.

One side effect of a virtual memory system is that two different programs may access the same physical location in memory using two different virtual addresses. Consequently, caches insure data coherency by using the physical address to keep track of the cached data. That is, the tags are physical addresses. Additionally, physical addresses should be used for the index. However, using physical addresses for the index may be detrimental to performance for the reason now described.

The desire for larger caches continues, and the increase in integration densities of microprocessor integrated circuits has enabled modern microprocessors to employ relatively large caches. Borrowing from the examples above, assume a 64 KB four-way set associative cache with 32-byte cache lines in a paging system with 4 KB pages. Each set comprises 128 bytes of data in the four cache lines of the set. This results in 512 sets in the array. As was seen from the example above, the index would be address bits 13:5. However, we also observe that address bits 13:12 are translated address bits, i.e., virtual address bits, not physical address bits.

One solution is to wait for the TLB to translate virtual address bits 13:12 and use the translated physical address bits 13:12 as the upper two bits of the index. However, this solution has the performance disadvantage that it now takes longer to index the cache to obtain or store data since we must wait for the TLB to perform its translation in order to use physical address bits 13:12 to index the cache. Potential consequences are that either the cycle time of the microprocessor must be increased, or another stage must be added to the microprocessor to accommodate the additional TLB lookup time to avoid lengthening the cycle time.

To avoid the performance penalty associated with waiting for the TLB to provide the translated physical address bits needed for the index, the microprocessor may use some of the virtual address bits in the index, such as virtual address bits 13:12 in the example above. A cache that uses some virtual address bits for its index is referred to as a virtual set cache. The cache is a virtual set cache because it is no longer deterministic as to which set in the cache array a given cache line may be stored in. Rather, the cache line may be stored in one of multiple sets since the virtual address bits used in the index may have multiple values to refer to the same physical cache line. The multiple sets that the cache line may be stored in are referred to as virtual sets. Using the example cache above, a cache line having physical address bits 13:12 with a value of 01 could be accessed with four different virtual addresses. That is, not only could the cache line be accessed with virtual address bit values 13:12 of 01, but also with values of 00, 10, and 11. Hence, the cache line could be stored in any one of four different virtual sets in the cache. The set selected by the physical address bits is referred to as the physical set.

A negative consequence of this aspect of virtual set caches is that they may incur what is referred to as a virtual set miss. A virtual set miss occurs when an instruction accesses data that is present in the cache, but because part of the index is virtual, the index selects one of the virtual sets other than the virtual set in which the data containing the cache line resides, i.e., other than the physical set. A virtual set miss generated by a store operation is a virtual set store miss.

The present inventors have examined code traces and observed that the Windows 98® operating system frequently executes two instructions within approximately 200 instructions of one another that store to the same physical memory address using two different virtual addresses. These instructions represent a situation in which a virtual set store miss would occur in a virtual set cache. Therefore, what is needed is a virtual set cache that does not incur a virtual set store miss penalty.

SUMMARY

The present invention provides a virtual set cache that avoids incurring a virtual set store miss penalty. Accordingly, in attainment of the aforementioned object, it is a feature of the present invention to provide a virtual set cache. The virtual set cache includes an array of $2^{}N$ sets of cache lines and associated tags. The virtual set cache also includes an index, coupled to the array, which includes M untranslated physical address bits of a store address for selecting $2^{}(N-M)$ virtual sets of the $2^{}N$ sets. The virtual set cache also includes a plurality of comparators, coupled to the array, which compare the associated tags in the $2^{}(N-M)$ virtual sets with a plurality of translated physical address bits of the store address. The virtual set cache also includes a hit signal, coupled to the comparators, which indicates a hit in the virtual set cache if one of the associated tags in the $2^{**}(N-M)$ virtual sets matches the plurality of translated physical address bits of the store address.

In another aspect, it is a feature of the present invention to provide a microprocessor. The microprocessor includes a translation lookaside buffer (TLB), that receives a virtual page number of a store operation and provides a physical page address of the virtual page number. The microprocessor also includes a virtual set cache, coupled to the TLB, that receives a physical cache line offset of the store operation. The physical cache line offset selects a plurality of virtual sets comprised in the virtual set cache. The virtual set cache queries which one of the plurality of virtual sets contains a cache line specified by the store operation based on the physical page address provided by the TLB. The microprocessor also includes an address register, coupled to the virtual set cache, which stores a matching virtual set number that specifies the one of the plurality of virtual sets specified by the store operation. The microprocessor updates the cache line based on the matching virtual set number stored in the address register, if the virtual set cache indicates a portion of the virtual page number used to index the virtual set cache would have generated a virtual set store miss.

In another aspect, it is a feature of the present invention to provide a method for storing data specified by an address of a store instruction into a virtual set cache. The method includes indexing into the cache using untranslated physical address bits of the address of the store instruction to select a plurality of virtual sets of cache lines and associated tags. The method also includes translating virtual address bits of the address of the store instruction into translated physical address bits, and comparing the associated tags with the translated physical address bits. The method also includes saving a matching virtual set number of a matching one of the plurality of virtual sets based on the comparing. The method also includes indexing into the cache using the matching virtual set number to update the matching one of the plurality of virtual sets, if the matching one of the plurality of virtual sets is not a same virtual set as specified by the virtual address bits of the store instruction.

An advantage of the present invention is that it avoids the virtual set store miss penalty without requiring a large amount of additional logic.

Other features and advantages of the present invention will become apparent upon study of the remaining portions of the specification and drawings.

BRIEF DESCRIPTION OF THE DRAWINGS

FIG. 7 is a block diagram illustrating three successive contents of the data cache after three executions of store instructions according to the present invention.

DETAILED DESCRIPTION

Figure 1:
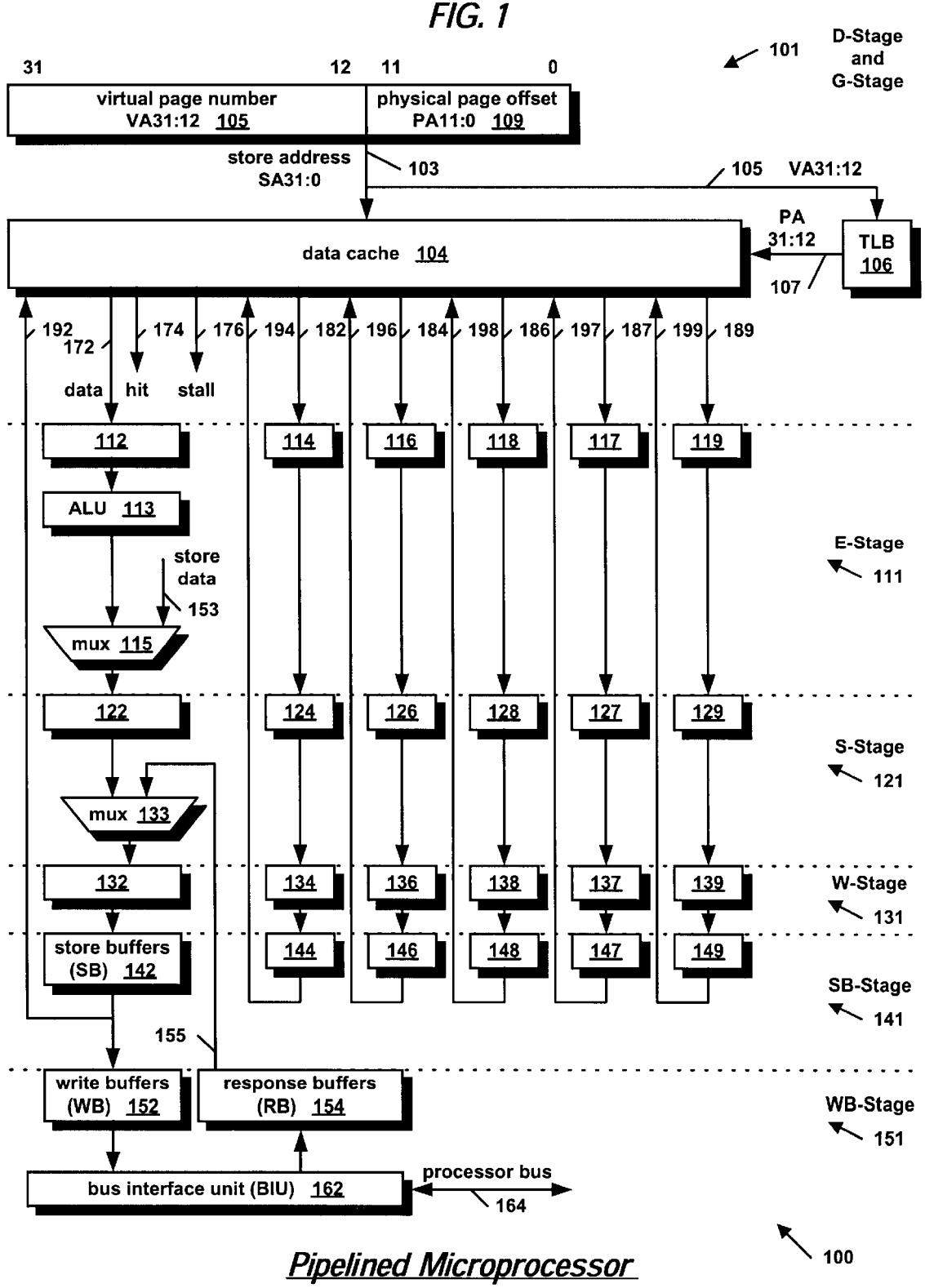
FIG. 1 is a block diagram illustrating a pipelined microprocessor according to the present invention.

Referring now to FIG. 1, a block diagram illustrating a pipelined microprocessor 100 according to the present invention is shown. The microprocessor 100 comprises a plurality of stages. FIG. 1 shows the lower stages of the microprocessor 100 pipeline. The pipeline stages comprise two data cache access stages, denoted D-stage and G-stage 101, followed by an execution stage (E-stage) 111, followed by a store stage (S-stage) 121, followed by a write-back stage (W-stage) 131, followed by a store-buffer stage (SB-stage) 141, followed by a write-buffer stage (WB-stage) 151. The microprocessor 100 pipeline also includes upper stages, not shown, which include an instruction fetch stage, an instruction format stage, an instruction translation stage, a register file access stage, and an address generation stage.

The microprocessor 100 comprises a data cache 104 in the D-stage and G-stage 101. In one embodiment, the data cache 104 comprises a 4-way set-associative 64 KB data cache. In one embodiment, the data cache 104 comprises an array of 512 sets of four 32-byte cache lines, each of the four ways in the set storing one of the four cache lines in the set.

The data cache 104 receives a store address 103 of a store operation, or store instruction. A portion of the store address 103 is used to index into the array of sets in the data cache 104. In one embodiment, the store address 103 comprises 32 bits, denoted SA31:0. The store address 103 specifies the address of store data to be stored into the data cache 104. The store address 103 is a virtual address. The store address 103 comprises a virtual page number portion 105, which is virtual address bits 31:12, denoted VA31:12 105. The store address 103 also comprises a physical page offset portion 109, which is untranslated physical address bits 11:0, denoted PA11:0 109.

The microprocessor 100 also comprises a translation lookaside buffer (TLB) 106 in the D-stage and G-stage 101. The TLB 106 receives VA31:12 105 of the store address 103. The TLB 106 looks up the virtual page number 105 and if the virtual page number 105 is cached in the TLB 106, the TLB 106 provides translated physical address bits 107, denoted PA31:12 107, to the data cache 104. The translated physical address 107 is also referred to as the physical page address 107.

The data cache 104 generates data 172 in response to a load operation. A register 112 in the E-stage 111 receives the data 172 from the data cache 104.

The data cache 104 also generates a hit signal 174. The data cache 104 generates a true value on the hit signal 174 if the store address 103 hits in the data cache 104. That is, if the data specified by the store address 103 is cached in the data cache 104, then the data cache 104 generates a true value on the hit signal 174, as will be described in more detail below.

The data cache 104 also generates a stall signal 176. The data cache 104 generates a true value on the stall signal 176 if the store address 103 misses in the data cache 104. That is, if the data specified by the store address 103 is not cached in the data cache 104, then the data cache 104 generates a true value on the stall signal 176 to stall the pipeline until the cache line specified by the store address 103 is fetched from memory, as will be described in more detail below.

The data cache 104 also generates a virtual set store miss indicator 187. A register 117 in the E-stage 111 receives the virtual set store miss indicator 187 from the data cache 104. The virtual set store miss indicator 187 is piped down the pipeline and provided back to the data cache 104 as virtual set store miss indicator 197 during an update pass of the store operation. The virtual set store miss indicator 187 is piped down the pipeline via registers 127, 137, and 147 in the S-stage 121, W-stage 131, and SB-stage 141, respectively. Register 147 provides the virtual set store miss indicator 197 back to the data cache 104. The virtual set store miss indicator 197 is used to redirect store data to a correct virtual set in the data cache 104 if the store address 103 would have generated a virtual set store miss, as will be described in more detail below.

The data cache 104 also generates an original virtual set number signal 189. The original virtual set number 189 is the original virtual address bits 13:12 of the store address 103. A register 119 in the E-stage 111 receives the original virtual set number 189 from the data cache 104. The original virtual set number 189 is piped down the pipeline via registers 129, 139, and 149 in the S-stage 121, W-stage 131, and SB-stage 141, respectively. In one embodiment, the original virtual set number 189 comprises two bits, which are also referred to as the original virtual address bits, denoted OVA13:12 199, after they are piped down the pipeline and provided back to the data cache 104 during an update pass of the store operation. Register 149 provides the OVA13:12 199 back to the data cache 104.

The data cache 104 also generates a matching virtual set number signal 182. A register 114 in the E-stage 111 receives the matching virtual set number 182 from the data cache 104. The matching virtual set number 182 is piped down the pipeline via registers 124, 134, and 144 in the S-stage 121, W-stage 131, and SB-stage 141, respectively. In one embodiment, the matching virtual set number 182 comprises two bits, which are also referred to as the redirect address bits, denoted RA13:12 194, after they are piped down the pipeline and provided back to the data cache 104 during an update pass of the store operation. Register 144 provides the RA13:12 194 back to the data cache 104.

The data cache 104 also generates a matching way number signal 184. A register 116 in the E-stage 111 receives the matching way number 184 from the data cache 104. The matching way number 184 is piped down the pipeline via registers 126, 136, and 146 in the S-stage 121, W-stage 131, and SB-stage 141, respectively. In one embodiment, the matching way number 184 comprises two bits, which are also referred to as the redirect way bits 196 after they are piped down the pipeline and provided back to the data cache 104 during the update pass of the store operation. Register 146 provides the redirect way bits 196 back to the data cache 104.

The data cache 104 also generates a matching status signal 186. A register 118 in the E-stage 111 receives the matching status signal 186 from the data cache 104. In one embodiment, the matching status signal 186 comprises MESI (modified, exclusive, shared, and invalid) bits, which are also referred to as the redirect status bits 198 after they are piped down the pipeline and provided back to the data cache 104 during the update pass of the store operation. The matching status signal 186 is piped down the pipeline via registers 128, 138, and 148 in the S-stage 121, W-stage 131, and SB-stage 141, respectively. Register 148 provides the redirect status bits 198 back to the data cache 104.

The microprocessor 100 also comprises an arithmetic logic unit (ALU) 113 in the E-stage 111. The ALU 113 receives data from register 112.

The microprocessor 100 also comprises a multiplexer 115 in the E-stage 111. The multiplexer 115 receives a result from the ALU 113. The ALU 113 result may become store data for a store operation. In addition, the multiplexer 115 receives store data 153 from a register file in the microprocessor 100 or as immediate data in a store instruction. The selected store data output by the multiplexer 115 is piped down the pipeline via registers 122 and 132 in the S-stage 121 and W-stage 131, respectively.

The microprocessor 100 also comprises a multiplexer 133 in the S-stage 121. The multiplexer 133 receives the store data from register 122. The multiplexer 133 also receives cache line data 155 from a response buffer (RB) 154 in the WB-stage 151. The response buffer 154 receives a cache line from a bus interface unit (BIU) 162. The BIU 162 fetches cache lines from memory via a processor bus 164, which couples the BIU 162 to the memory. The output of the multiplexer 133 is provided to register 132 in the W-stage 131.

The microprocessor 100 also comprises store buffers (SB) 142 in the SB-stage 141. The store buffers 142 receive data from register 132. The store buffers 142 hold store data 192 that is provided to the data cache 104 for storing into the data cache 104. The store data 192 from the store buffer 142 is also provided to write buffers (WB) 152 in the WB-stage 151. The write buffers 152 hold write data waiting to be written to memory on the processor bus 164 by the BIU 162.

Figure 2:
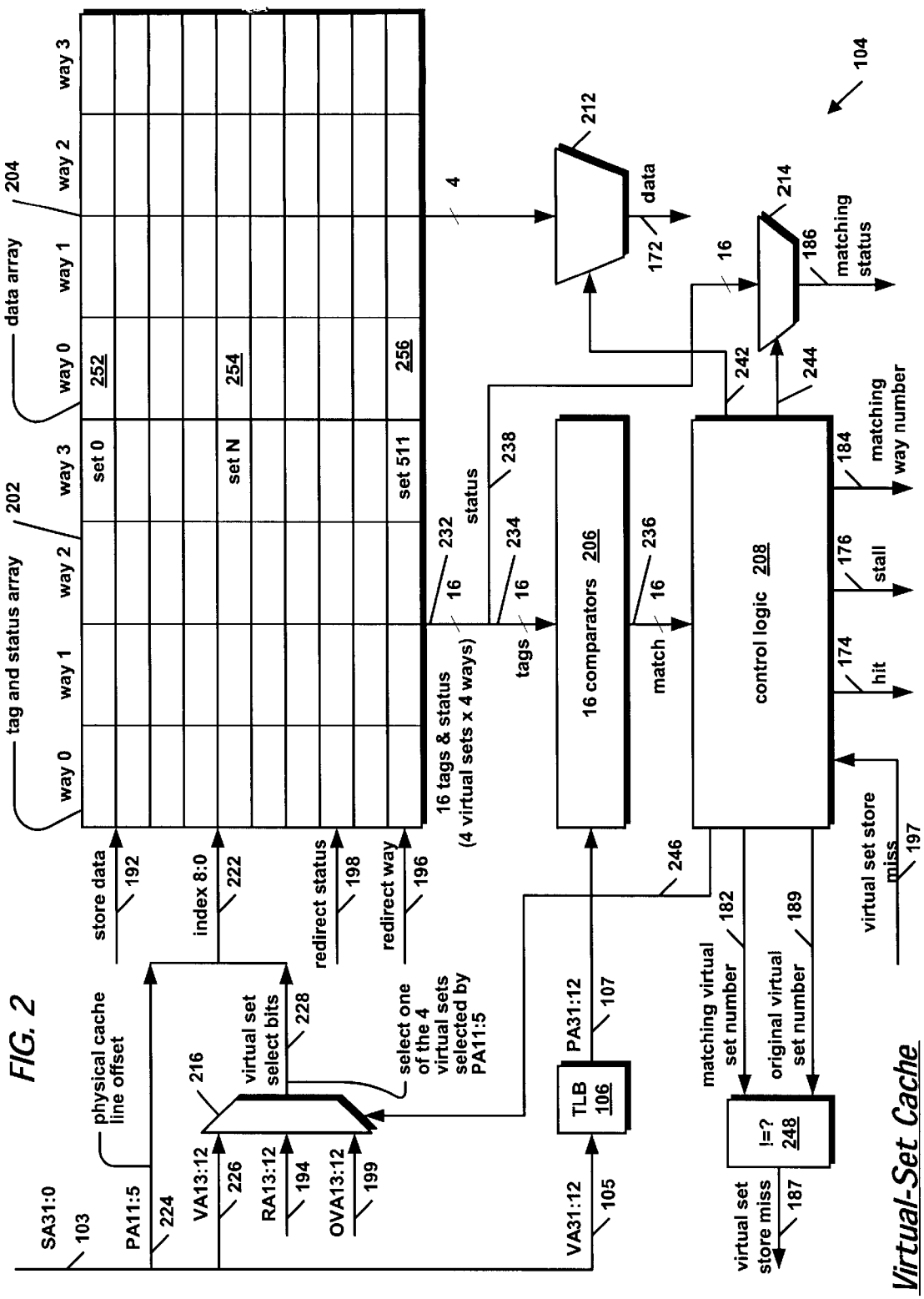
FIG. 2 is a block diagram illustrating the data cache of FIG. 1 according to the present invention.

Referring now to FIG. 2, a block diagram illustrating the data cache 104 of FIG. 1 is shown. The data cache 104 comprises a tag and status array 202 and a data array 204. In one embodiment, the arrays 202 and 204 comprise four ways, denoted way 0, way 1, way 2, and way 3.

In one embodiment, the data array 204 comprises 512 sets of cache lines. Three representative sets are shown, denoted set 0 252, set N 254, and set 511 256. Set 0 252 is the first or top set in the arrays 202 and 204; set 511 256 is the last or bottom set in the arrays 202 and 204; and set N 254 is a middle set in the arrays 202 and 204. The arrays 202 and 204 are indexed by an index 222, which selects one of the sets. In one embodiment, the index 222 comprises 9 bits, denoted index 8:0, for selecting one of the 512 sets.

The lower 7 bits of the index 222 comprise physical address bits 11:5 of the store address 103 of FIG. 1, denoted PA11:5 224. PA11:5 224 are also referred to as the physical cache line offset 224. The physical cache line offset 224 specifies the offset of a 32-byte cache line from the base address of a physical page of memory.

The upper 2 bits of the index 222 comprise virtual set select bits 228. The virtual set select bits 228 are concatenated with the PA11:5 224 bits to create the index 222. The virtual set select bits 228 are provided by the output of a multiplexer 216. The virtual set select bits 228 select one of four virtual sets in the data cache 104 selected by PA11:5 224, as will be described below.

A first input of the multiplexer 216 receives virtual address bits 13:12 of the store address 103, denoted VA13:12 226. A second input of the multiplexer 216 receives redirect address bits RA13:12 194 of FIG. 1. A third input of the multiplexer 216 receives original virtual address bits OVA13:12 199 of FIG. 1. A control input of the multiplexer 216 receives control signal 246 from control logic 208. The control logic 208 receives the virtual set store miss indicator 197 of FIG. 1 and generates the control signal 246 based upon the virtual set store miss indicator 197 to control the multiplexer 216 to select one of the inputs as will now be described.

Figure 3:
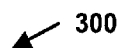
FIG. 3 is a table illustrating operation of the virtual set select bit multiplexer of FIG. 2 according to the present invention.

Referring now to FIG. 3 a table 300 illustrating operation of the virtual set select bit multiplexer 216 of FIG. 2 is shown. The table 300 comprises two columns and four rows. The first column specifies an action taken with respect to the data cache 104 of FIG. 1. The second column specifies which of the inputs is selected by the multiplexer 216 as the virtual set select bits 228.

The first row of table 300 indicates that when a load operation is performed on the data cache 104 of FIG. 1, the multiplexer 216 selects the VA13:12 226 bits of FIG. 2. That is, the store address 103 is a load address during a load operation, and the multiplexer 216 selects the VA13:12 226 bits to select a set from the arrays 202 and 204 of FIG. 2.

The second row of table 300 indicates that when a store query operation is applied to the data cache 104, a don't care condition exists with respect to which bits the multiplexer 216 selects. A store operation is performed in a two-pass manner with respect to the data cache 104. The first pass is referred to as the query pass. The second pass is referred to as the update pass. During the query pass, the tag and status array 202 of FIG. 2 is queried to determine if the cache line specified by the store address 103 is present in the data cache 104, and if so, the status and location in the data cache 104 of the cache line. During the query pass of a store operation, the data cache 104 examines all four virtual sets selected by the PA11:5 bits 224 of FIG. 4, as will be described below.

The third row of table 300 indicates that during the update pass of a store operation whose corresponding query pass generated a miss in the data cache 104 of the store address 103, the multiplexer 216 selects OVA13:12 199.

The fourth row of table 300 indicates that during the update pass of a store operation whose corresponding query pass generated a hit in the data cache 104 of the store address 103, the multiplexer 216 selects RA13:12 194.

Figure 5:
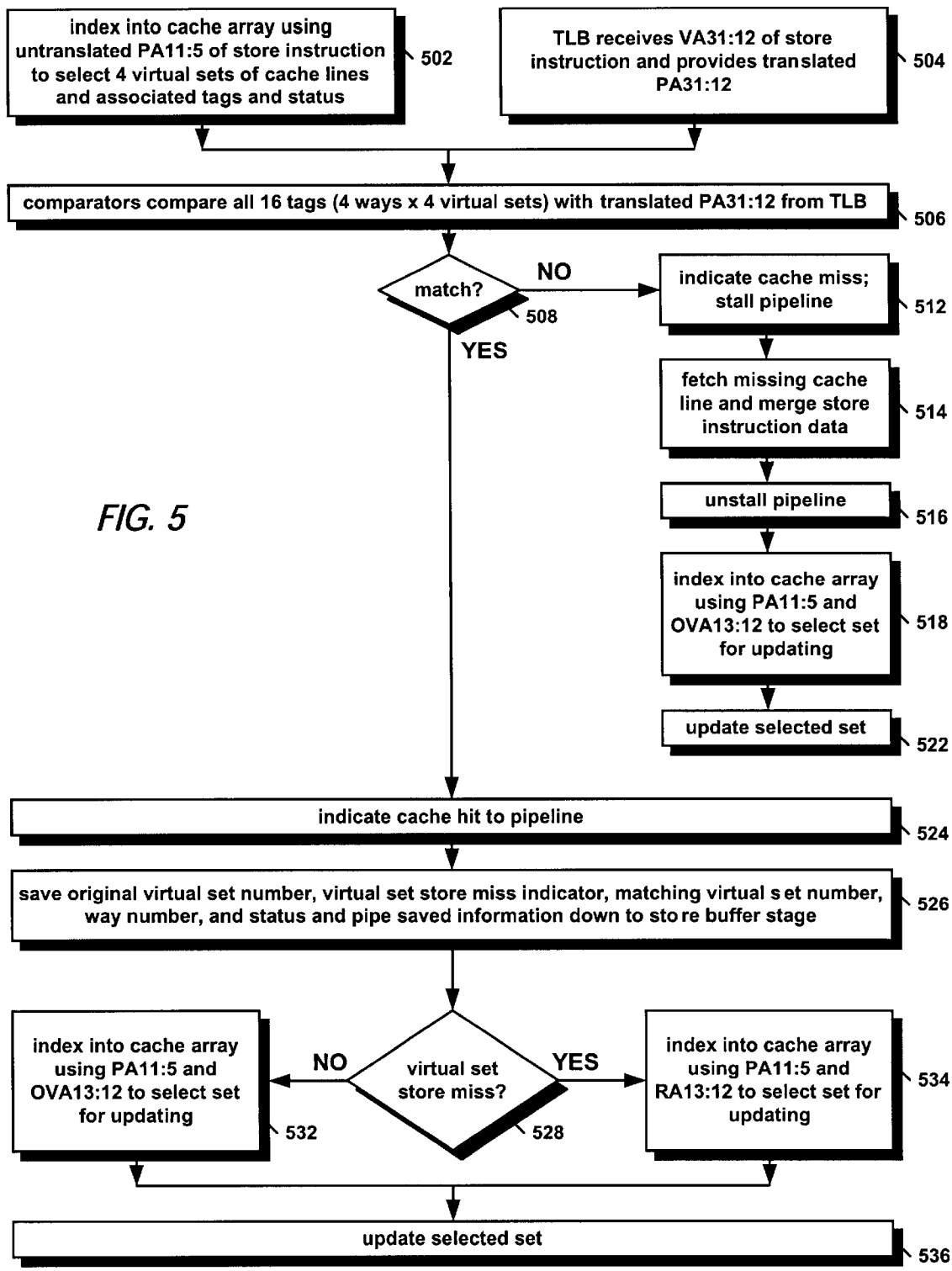
FIG. 5 is a flowchart illustrating operation of the data cache of FIG. 1 according to the present invention.

The purposes of the operation of the multiplexer 216 as described in table 300 will become more evident with respect to the remainder of the disclosure, and in particular with respect to FIG. 5.

Referring again to FIG. 2, the data cache 104 also receives the store data 192, redirect status 198, and redirect way 196, of FIG. 1. These values are used to update the data cache 104 as will be described below.

The data cache 104 also comprises a multiplexer 212. In response to a load operation, the multiplexer 212 receives four cache lines, one from each of the four ways of the set of the data array 204 selected by the index 222. The multiplexer 212 selects one of the four cache lines and provides the selected cache line as load data 172 of FIG. 1. The multiplexer 212 selects one of the four cache lines based on a control signal 242 generated by control logic 208.

In response to the index 222, the tag and status array 202 outputs 16 tags and status values 232. The 16 tags and status values 232 comprise a tag and status value from each of the four ways in each of four virtual sets selected by the PA11:5 bits 224 of the index 222, as will be described below with respect to FIG. 4.

The data cache 104 also comprises 16 comparators 206. Each of the comparators 206 compares the PA31:12 bits 107 of FIG. 1 generated by the TLB 106 with a corresponding one of the 16 tags 234 output by the tag and status array 202. The 16 comparators 206 generate 16 match signals 236. A match signal 236 has a true value if the compared tag matches the PA31:12 bits 224. The 16 match signals 236 are provided to the control logic 208 so that the control logic 208 can determine which, if any, of the tags in the ways in the virtual sets matches the PA31:12 bits 107. The control logic 208 uses the 16 match signals 236 to generate the hit signal 174, the stall signal 176, the matching virtual set number signal 182, and the matching way number signal 184 of FIG. 1.

The data cache 104 also comprises a comparator 248 that compares the matching virtual set number signal 182 and the original virtual set number 189 to generate the virtual set store miss indicator 187 of FIG. 1. If the matching virtual set number signal 182 and the original virtual set number 189 are not equal, the comparator 248 generates a true indication on the virtual set store miss indicator 187. Otherwise, the comparator 248 generates a false indication.

The data cache 104 also comprises a multiplexer 214. The multiplexer 214 receives the 16 statuses 238 output by the tag and status array 202. The multiplexer 214 selects one of the 16 statuses 238 as the matching status 186 of FIG. 1. The control logic 208 uses the 16 match signals 236 to generate control signal 244, which controls the multiplexer 214 to select the matching status 186.

Figure 4:
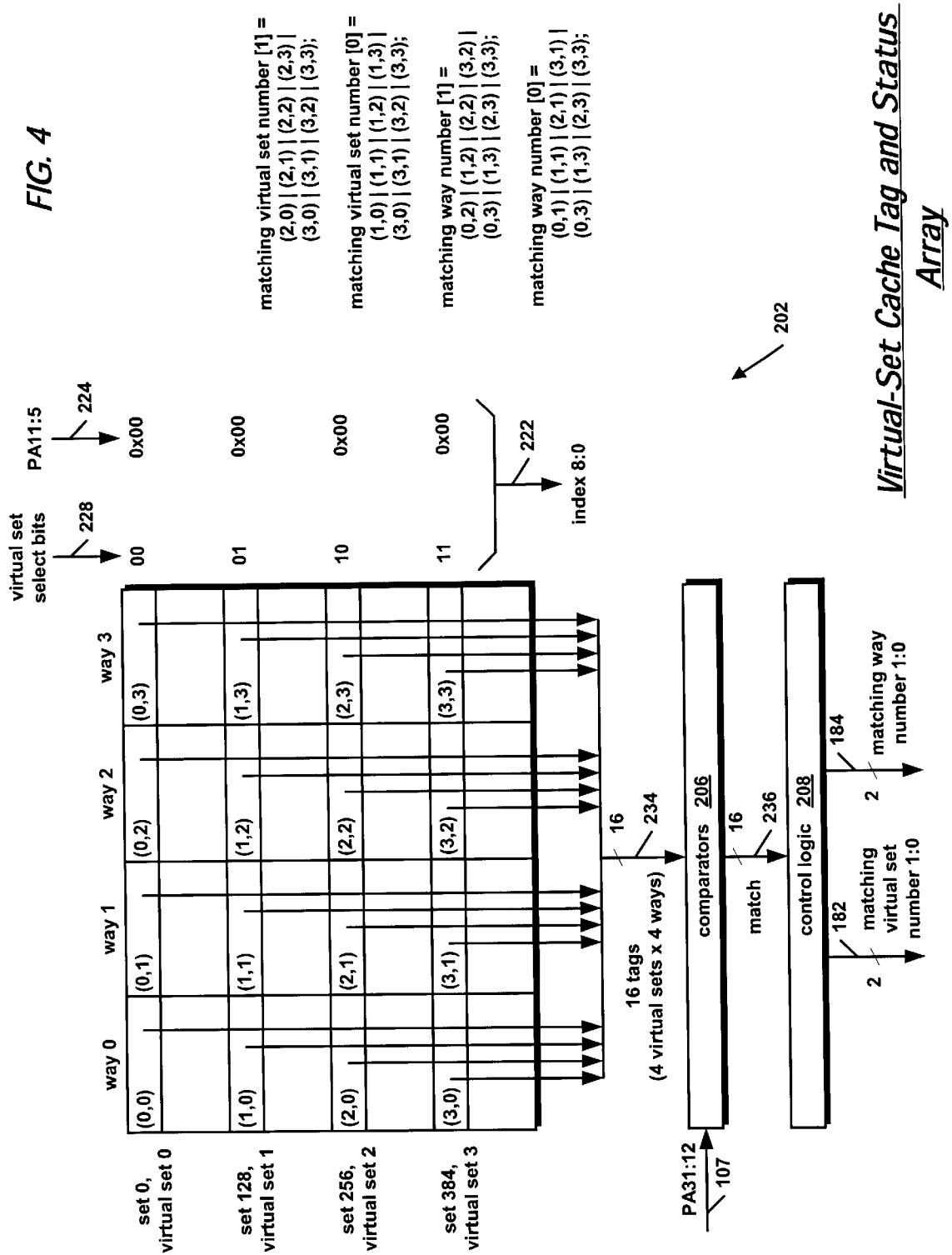
FIG. 4 is a block diagram of the tag and status array of FIG. 2 according to the present invention.

Referring now to FIG. 4, a block diagram of the tag and status array 202 of FIG. 2 is shown. In the example of FIG. 4, untranslated index bits 6:0, i.e., PA11:5 224 of FIG. 2, equal 0000000b, or 0x00. Consequently, set 0, set 128, set 256, and set 384 are selected by the untranslated bits 224 of the index 222. Set 0 is referred to as virtual set 0 since it is the set that would be chosen by a value of 0 on the virtual set select bits 228 of FIG. 2. Set 128 is referred to as virtual set 1 since it is the set that would be chosen by a value of 1 on the virtual set select bits 228. Set 256 is referred to as virtual set 2 since it is the set that would be chosen by a value of 2 on the virtual set select bits 228. Set 384 is referred to as virtual set 3 since it is the set that would be chosen by a value of 3 on the virtual set select bits 228. Each of the possible values of the virtual set select bits 228 of FIG. 2 are also shown. That is, a value of 00 b on the virtual set select bits 228 selects virtual set 0; a value of 01 b on the virtual set select bits 228 selects virtual set 1; a value of 10 b on the virtual set select bits 228 selects virtual set 2; and a of 11 b on the virtual set select bits 228 selects virtual set 3.

The tag and status of each of the four ways in each of the four virtual sets is denoted by an ordered pair, with the ordinate being the virtual set number, and the abscissa being the way number. Hence, for example, the tag and status in way 2 of virtual set 1 is denoted by the ordered pair (1,2). The 16 tags 234 of FIG. 2 are provided to the comparators 206 of FIG. 2. The comparators compare each of the 16 tags denoted by the 16 ordered pairs in FIG. 4 with the PA31:12 bits 107 of FIG. 1. The match signals 236 of FIG. 2 generated by the comparators 206 are provided to the control logic 208 of FIG. 2. The control logic 208 generates the two bits of the matching virtual set number signal 1:0 182 and the two bits of the matching way number signal 1:0 184 of FIG. 1 based on the 16 match signals 236 according to the equations below and shown in FIG. 4. In the equations, the ordered pairs denote the value of the match signal 236 generated based on a comparison of the corresponding tag specified by the ordered pair.

$$\text{matching virtual set number [1]} = \frac{(2,0) \mid (2,1) \mid (2,2) \mid (2,3) \mid}{(3,0) \mid (3,1) \mid (3,2) \mid (3,3);}$$

$$\text{matching virtual set number [0]} = \frac{(1,0) \mid (1,1) \mid (1,2) \mid (1,3) \mid}{(3,0) \mid (3,1) \mid (3,2) \mid (3,3);}$$

$$\text{matching way number [1]} = \frac{(0,2) \mid (1,2) \mid (2,2) \mid (3,2) \mid}{(0,3) \mid (1,3) \mid (2,3) \mid (3,3);}$$

$$\text{matching way number [0]} = \frac{(0,1) \mid (1,1) \mid (2,1) \mid (3,1) \mid}{(0,3) \mid (1,3) \mid (2,3) \mid (3,3);}$$

Referring now to FIG. 5, a flowchart illustrating operation of the data cache 104 of FIG. 1 according to the present invention is shown. Flow begins at blocks 502 and 504.

At block 502, a store query pass begins as a store operation proceeds to the D-stage 101 of FIG. 1 and the data cache 104 of FIG. 1 is indexed using untranslated address bits PA 11:5 224 of FIG. 2 of the store address 103 of FIG. 1 as index bits 6:0 222 of FIG. 2. Address bits PA 11:5 224 select four virtual sets of cache lines from the data array 204 of FIG. 2 and tags and status from the tag and status array 202 of FIG. 2, such as virtual sets 0 through 3 of FIG. 4. Flow proceeds from block 502 to block 506.

At block 504, the TLB 106 of FIG. 1 receives address bits VA31:12 226 of FIG. 2 of the store address 103 and provides translated address bits PA31:12 107 of FIG. 1 to the comparators 206 of FIG. 2. Flow proceeds from block 504 to block 506. Blocks 502 and 504 are performed substantially in parallel. That is, the store address 103 is applied to both the data cache 104 and the TLB 106 substantially simultaneously. In particular, the data cache 104 does not wait for the TLB 106 to provide PA31:12 107 before it selects the four virtual sets using PA 11:5 224.

At block 506, the comparators 206 compare the 16 tags 234 of FIG. 2 with the translated PA31:12 107 that was provided by the TLB 106 in block 504 to generate the 16 match signals 236 of FIG. 2. Flow proceeds from block 506 to decision block 508.

At decision block 508, the control logic 208 examines the 16 match signals 236 of FIG. 2 generated during block 506 to determine whether any, and if so which one, of the 16 tags 234 matches the PA31:12 107. If no tags match, flow proceeds to block 512. Otherwise, flow proceeds to block 524.

At block 512, the control logic 208 generates a false value on the hit signal 174 of FIG. 1 to indicate a miss of the data cache 104 and generates a true value on the stall signal 176 of FIG. 1 to stall the microprocessor 100 pipeline. Flow proceeds from block 512 to block 514.

At block 514, the BIU 162 of FIG. 1 performs a bus transaction on the processor bus 164 of FIG. 1 to fetch the missing cache line in the response buffer 154 of FIG. 1. The microprocessor 100 then merges the store data 153 of FIG. 1 associated with the store operation with the cache line fetched into the response buffer 154, and places the merged data into the store buffers 142 of FIG. 1. Flow proceeds from block 514 to block 516.

At block 516, the control logic 208 deasserts the stall signal 176 to unstall the microprocessor 100 pipeline. Flow proceeds from block 516 to block 518.

At block 518, the control logic 208 generates control signal 246 to control the multiplexer 216 of FIG. 2 to select address bits OVA13:12 199 of FIG. 1 as the virtual set select bits 228 of FIG. 2. Consequently, the data cache 104 is indexed using concatenated PA11:5 224 and OVA13:12 199 to form index bits 8:0 222 to select a set in the data cache 104 to update. Flow proceeds from block 518 to block 522.

At block 522, the set in the data cache 104 selected during block 518 is updated with the data merged into the store buffers 142 during block 514. Flow ends at block 522.

At block 524, the control logic 208 generates a true value on the hit signal 174 to indicate to the pipeline that the store address 103 hit in the data cache 104. In particular, the control logic 208 generates a hit as long as any of the match signals 236 is true, regardless of whether the match signal 236 corresponding to the virtual set that would have been selected by the address bits VA13:12 226 is true. In other words, even if a virtual set store miss would have occurred, the control logic 208 still indicates a hit in the data cache 104. Flow proceeds from block 524 to block 526.

At block 526, the original virtual set number 189, virtual set store miss indicator 187, matching virtual set number signal 182, matching way number signal 184, and matching status 186 of FIG. 1 are saved in registers 119, 117, 114, 116, and 118, respectively, of FIG. 1 and piped down to the SB-stage 141 in order to perform the update pass of the store operation. Flow proceeds from block 526 to decision block 528.

At decision block 528, the control logic 208 determines whether a virtual set store miss would have been generated by the store operation. That is, the control logic 208 determines whether the virtual set store miss signal 197 is true. If not, flow proceeds to block 532. Otherwise, flow proceeds to block 534.

At block 532, the control logic 208 generates control signal 246 to control the multiplexer 216 of FIG. 2 to select the original virtual address bits OVA13:12 199 as the virtual set select bits 228 of FIG. 2. Consequently, the data cache 104 is indexed using concatenated PA11:5 224 and OVA13:12 199 to form index bits 8:0 222 to select a set in the data cache 104 to update. That is, the original virtual set specified by the original virtual address bits 13:12 of the store address 103 is selected for updating. Flow proceeds from block 532 to block 536.

At block 534, the control logic 208 generates control signal 246 to control the multiplexer 216 of FIG. 2 to select the redirect address bits RA13:12 194 as the virtual set select bits 228 of FIG. 2. Consequently, the data cache 104 is indexed using concatenated PA11:5 224 and RVA13:12 194 to form index bits 8:0 222 to select a set in the data cache 104 to update. That is, the matching virtual set is selected for updating rather than the virtual set specified by the original virtual address bits 13:12 of the store address 103, since the original virtual address bits 13:12 would have generated a virtual set store miss. Flow proceeds from block 534 to block 536.

At block 536, the set in the data cache 104 selected during block 532 or block 534 is updated with the store data of the store operation from the store buffers 142. Flow ends at block 536.

Figure 6:
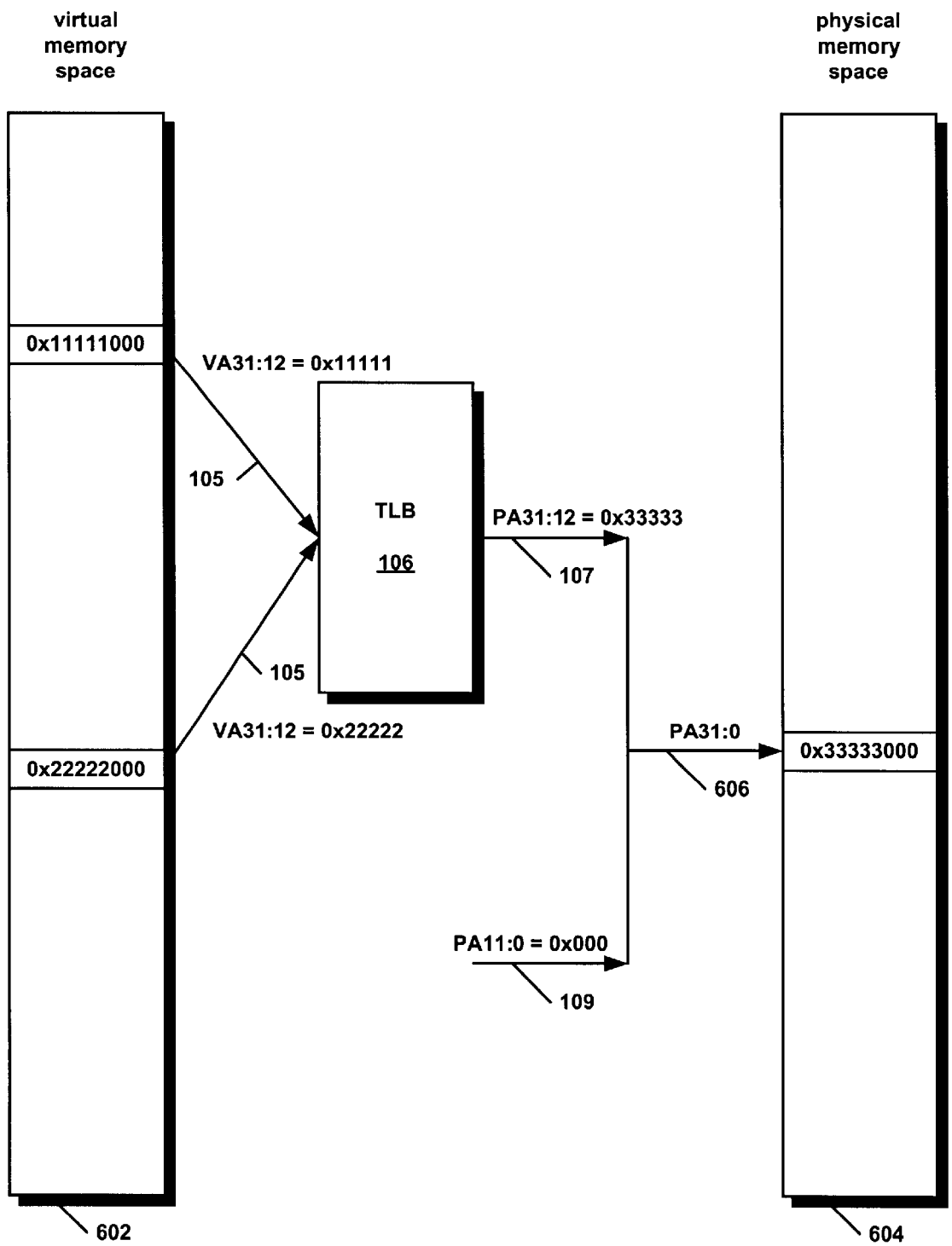
FIG. 6 is a block diagram illustrating an example of the translation of two distinct virtual store addresses, such as the store address of FIG. 1, to the same physical address according to the present invention.

Referring now to FIG. 6, a block diagram illustrating an example of the translation of two distinct virtual store addresses, such as store address 103 of FIG. 1, to the same physical address is shown. The example of FIG. 6 is used to illustrate how two store operations may generate a virtual set store miss condition. The example will be used in conjunction with FIG. 7 to illustrate how the present invention generates a cache hit in a situation that would have resulted in a virtual set store miss.

FIG. 6 illustrates a virtual memory space 602 of the microprocessor 100 of FIG. 1. First and second virtual memory store addresses, 0×11111000 and 0×22222000, respectively, are shown. The VA31:12 bits 105 of FIG. 1 of the first exemplary virtual store address having a value of 0×11111 are provided to the TLB 106 of FIG. 1. The TLB 106 generates a translated physical address value of PA31:12 bits 107 of 0×33333 in the example. In the example, untranslated physical address bits PA11:0 109 of FIG. 1 are equal to 0×000. The PA11:0 bits 109 are concatenated with the PA31:12 bits 107 to generate physical address PA31:0 bits 606 having a value of 0×33333000, which specifies a location in a physical memory space 604 of the microprocessor 100 on the processor bus 164 of FIG. 1.

Similarly, the VA31:12 bits 105 of the second exemplary virtual store address having a value of 0×22222 are provided to the TLB 106. The TLB 106 generates a translated physical address value of PA31:12 bits 107 of 0×33333 in the example, which are the same PA31:12 bits as the first virtual store address. In the example, untranslated physical address bits PA11:0 109 if the second virtual store address are equal to 0×000, which are the same as the PA11:0 bits 109 of the first exemplary store virtual address. Hence, the PA11:0 bits 109 are concatenated with the PA31:12 bits 107 to generate the same physical address PA31:0 bits 606 having a value 0×33333000, which specifies the same location in the physical memory space 604 of the microprocessor 100 as the first virtual store address.

Referring now to FIG. 7, a block diagram illustrating three successive contents of the data cache 104 after three executions of store instructions is shown. The three contents of the data cache 104 are denoted 104A, 104B, and 104C, respectively, and represent a chronological sequence of store instruction executions. In each of the data caches 104A, 104B, and 104C, a matrix is shown whose columns show the four cache ways of FIG. 4 and whose rows show the four different virtual sets of FIG. 4, denoted VS0, VS1, VS2, and VS3.

Data cache 104A shows the contents after execution of a store instruction having the first exemplary virtual store address of FIG. 6, i.e., 0×11111000. The instruction is ST 0×11111000 0×AA, i.e., a store of a byte of data with a value 0×AA to virtual address 0×11111000, which translates to physical address 0×33333000. For simplicity and clarity of explanation, all four ways of VS1 of the data cache 104A are assumed empty, i.e., invalid, just prior to execution of the first store instruction. Hence, a miss of the data cache 104A is detected, according to block 508 of FIG. 5. The data cache 104A indicates a miss, the pipeline is stalled, the missing cache line is fetched, and then the pipeline is unstalled, according to blocks 512, 514, and 516 of FIG. 5. The data cache 104A is indexed using OVA13:12 bits 199 of FIG. 1 to select a set for updating, according to block 518 of FIG. 5. Consequently, VS1 is selected, since the OVA13:12 bits 199 have a value of 01 b. In the example, way 2 is the least recently used way, and is therefore chosen for updating. Way 2 of VS1 of the data cache 104A is shown with a data value of 0×AA, according to block 522 of FIG. 5. In addition, way 2 of VS1 of the data cache 104A is updated with the tag value of the PA31:12 bits 107 value of 0×33333. Finally, way 2 of VS1 of the data cache 104A is shown with a modified status value, indicated by "M".

Data cache 104B shows the contents after execution of a store instruction having the second exemplary virtual store address of FIG. 6, i.e., 0×22222000. The instruction is ST 0×22222000 0×BB, i.e., a store of a byte of data with a value 0×BB to virtual address 0×22222000, which translates to physical address 0×33333000. All four ways of VS2 of the data cache 104B are assumed empty, i.e., invalid, just prior to execution of the second store instruction. However, a hit of the data cache 104B is detected, according to block 508, because the comparators 206 of FIG. 2 compare all 16 tags from the four ways of the four virtual sets, according to block 506 of FIG. 5, and detect that the tag of way 2 of VS1 matches the PA31:12 bits 107 of FIG. 1 and the cache line status has a value of modified, indicating valid data. Consequently, the data cache 104B indicates a hit, according to block 524 of FIG. 5. The original virtual set number 189, virtual set store miss indicator 187, the matching virtual set number 182, the matching way number 184, and the matching status 186 of FIG. 1 are saved and piped down to the S-stage 121 of FIG. 1, according to block 526 of FIG. 5.

Because a virtual set store miss would have occurred, as determined according to block 528 of FIG. 5, the data cache 104B is indexed using RA13:12 bits 194 of FIG. 1 to select a set for updating, according to block 534 of FIG. 5. Consequently, VS1 is selected, since the RA13:12 bits 194 have a value of 01 b. Way 2 of VS1 of the data cache 104B is shown with a data value of 0×BB, according to block 536 of FIG. 5. In addition, way 2 of VS1 of the data cache 104B is updated with the tag value of the PA31:12 bits 107 value of 0×33333. Finally, way 2 of VS1 of the data cache 104B is shown with a modified status value, indicated by "M".

Data cache 104C shows the contents after a third store instruction, which is the second execution of the store instruction having the first exemplary virtual store address of FIG. 6, i.e., the ST 0×11111000 0×AA, which is the instruction executed to update the contents of data cache 104A described above. All four ways of VS2 of the data cache 104C are still assumed empty, i.e., invalid, just prior to execution of the third store instruction. However, a hit of the data cache 104C is detected, according to block 508, because the comparators 206 of FIG. 2 compare all 16 tags from the four ways of the four virtual sets, according to block 506, and detect that the tag of way 2 of VS1 matches the PA31:12 bits 107 and the cache line status has a value of modified, indicating valid data. Consequently, the data cache 104C indicates a hit, according to block 524. The original virtual set number 189, virtual set store miss indicator 187, the matching virtual set number 182, the matching way number 184, and the matching status 186 are saved and piped down to the S-stage 121, according to block 526.

Because a virtual set store miss would have occurred, as determined according to block 528, the data cache 104C is indexed using RA13:12 bits 194 to select a set for updating, according to block 534. Consequently, VS1 is selected, since the RA13:12 bits 194 have a value of 01 b. Way 2 of VS1 of the data cache 104C is shown with a data value of 0×AA, according to block 536. In addition, way 2 of VS1 of the data cache 104C is updated with the tag value of the PA31:12 bits 107 value of 0×33333. Finally, way 2 of VS1 of the data cache 104C is shown with a modified status value, indicated by "M".

As may be observed from FIG. 7, the present invention advantageously avoids stalling the microprocessor 100 pipeline and generating transactions on the processor bus 164, which would make store operations substantially more lengthy, in the case of a virtual set store miss.

Although the present invention and its objects, features, and advantages have been described in detail, other embodiments are encompassed by the invention. For example, the invention is adaptable to virtual set data caches of various size and store addresses of various size. Furthermore, the number of physical and virtual address bits in the store address may vary. Finally, the size of the cache tags and the type of cache status employed in the cache may vary.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A virtual set cache, comprising:
an array of 2**N sets of cache lines and associated tags;
an index, coupled to said array, comprising M untranslated physical address bits of a store address for selecting 2(N-M) virtual sets of said 2N sets;
a plurality of comparators, coupled to said array, for comparing said associated tags in said 2**(N-M) virtual sets with a plurality of translated physical address bits of said store address; and
a hit signal, coupled to said comparators, for indicating a hit in the virtual set cache if one of said associated tags in said 2**(N-M) virtual sets matches said plurality of translated physical address bits of said store address.

2. The virtual set cache of claim 1, wherein said index further comprises L virtual set select bits, said virtual set select bits for selecting one of said 2**(N-M) virtual sets.

3. The virtual set cache of claim 2, wherein L is greater than zero.

4. The virtual set cache of claim 2, wherein said L virtual set select bits are concatenated with said M untranslated physical address bits to form said index.

5. The virtual set cache of claim 2, further comprising:
a multiplexer, comprising:
an output, coupled to provide said virtual set select bits of said index;
first and second address inputs; and
a control input, for selecting one of said first and second address inputs for provision on said output.

6. The virtual set cache of claim 5, wherein said first address input is coupled to receive L virtual address bits of said store address.

7. The virtual set cache of claim 6, wherein said hit signal indicates said hit regardless of whether said L virtual address bits specify a matching one of said 2**(N-M) virtual sets.

8. The virtual set cache of claim 7, wherein said matching one of said 2(N-M) virtual sets has said one of said associated tags in said 2(N-M) virtual sets that matches said plurality of translated physical address bits of said store address.

9. The virtual set cache of claim 8, further comprising:
a register, coupled to said plurality of comparators, for storing L virtual set redirect bits.

10. The virtual set cache of claim 9, wherein said L virtual set redirect bits specify said matching one of said 2**(N-M) virtual sets.

11. The virtual set cache of claim 10, wherein said second address input is coupled to receive said L virtual set redirect bits.

12. The virtual set cache of claim 11, wherein said control input selects said second input for updating the cache with data specified by said store address if said hit signal indicates said hit in the virtual set cache.

13. The virtual set cache of claim 6, wherein said hit signal indicates a miss in the virtual set cache if none of said associated tags in said 2**(N-M) virtual sets matches said plurality of translated physical address bits of said store address.

14. The virtual set cache of claim 13, wherein said control input selects said first input for updating the cache with data specified by said store address if said hit signal indicates said miss in the virtual set cache.

15. The virtual set cache of claim 1, wherein said index is configured to select said 2(N-M) virtual sets of said 2N sets substantially in parallel with a lookup of virtual address bits of said store address in a translation lookaside buffer to provide said translated physical address bits of said store address.

16. A microprocessor, comprising:
a translation lookaside buffer (TLB), for receiving a virtual page number of a store operation and for providing a physical page address thereof;
a virtual set cache, coupled to said TLB, for receiving a physical cache line offset of said store operation that selects a plurality of virtual sets comprised therein, and for querying which one of said plurality of virtual sets contains a cache line specified by said store operation based on said physical page address provided by said TLB; and an address register, coupled to said virtual set cache, for storing a matching virtual set number that specifies said one of said plurality of virtual sets specified by said store operation;

wherein the microprocessor updates said cache line based on said matching virtual set number stored in said address register, if said virtual set cache indicates a portion of said virtual page number used to index said virtual set cache would have generated a virtual set store miss.

17. The microprocessor of claim 16, wherein said physical cache line offset selects said plurality of virtual sets in said virtual set cache substantially in parallel with said TLB providing said physical page address.

18. The microprocessor of claim 16, wherein said virtual set cache comprises an N-way set associative cache, wherein N is greater than zero.

19. The microprocessor of claim 18, further comprising:

a way register, coupled to said virtual set cache, for storing a matching way number, wherein said matching way number specifies one of said N-ways of said set associative cache containing said cache line based on said querying.

20. The microprocessor of claim 19, wherein the microprocessor updates said virtual set cache based on said matching way number stored in said way register, if said virtual set cache indicates said virtual page number would have generated a virtual store miss in said virtual set cache.

21. The microprocessor of claim 16, further comprising:

a status register, coupled to said virtual set cache, for storing a matching status, wherein said matching status specifies a cache line status of said cache line based on said querying.

22. The microprocessor of claim 21, wherein the microprocessor updates said virtual set cache based on said cache line status stored in said status register, if said virtual set cache indicates said virtual page number would have generated a virtual store miss in said virtual set cache.

23. A method for storing data specified by an address of a store instruction into a virtual set cache, the method comprising:

indexing into the cache using untranslated physical address bits of the address of the store instruction to select a plurality of virtual sets of cache lines and associated tags;

translating virtual address bits of the address of the store instruction into translated physical address bits;

comparing said translated physical address bits with said associated tags in said plurality of virtual sets;

saving a matching virtual set number of a matching one of said plurality of virtual sets based on said comparing;

indexing into the cache using said matching virtual set number to update said matching one of said plurality of virtual sets, if said matching one of said plurality of virtual sets is not a same virtual set as specified by said virtual address bits of the store instruction.

24. The method of claim 23, further comprising:

indexing into the cache using said virtual address bits of the store instruction to update said matching one of said plurality of virtual sets, if said matching one of said plurality of virtual sets is said same virtual set as specified by said virtual address bits of the store instruction.

25. The method of claim 23, wherein said indexing into the cache using said untranslated physical address bits begins before said translating ends.

26. The method of claim 23, wherein said indexing into the cache using said untranslated physical address bits is performed substantially in parallel with said translating.

27. The method of claim 23, wherein said indexing into the cache using said matching virtual set number to update said matching one of said plurality of virtual sets is performed without stalling a pipeline of a microprocessor comprising the virtual set cache.

28. The method of claim 23, wherein said indexing into the cache using said matching virtual set number further comprises indexing into the cache using said untranslated physical address bits concatenated with said matching virtual set number.

29. The method of claim 23, further comprising:

determining whether any of said associated tags match said translated physical address bits based on said comparing.

30. The method of claim 29, further comprising:

generating a true hit signal if any of said associated tags match said translated physical address bits based on said comparing.

31. The method of claim 29, further comprising:

generating a false hit signal if none of said associated tags match said translated physical address bits based on said comparing.

32. The method of claim 29, further comprising:

stalling a pipeline of a microprocessor comprising the virtual set cache if none of said associated tags match said translated physical address bits.

33. The method of claim 32, further comprising:

indexing into the cache using said virtual address bits of the store instruction to update the virtual set cache after said stalling.

* * * * *